(12) United States Patent
Fujii et al.

(10) Patent No.: US 8,405,953 B2
(45) Date of Patent: Mar. 26, 2013

(54) CAPACITOR-EMBEDDED SUBSTRATE AND METHOD OF MANUFACTURING THE SAME

(75) Inventors: Tomoharu Fujii, Nagano (JP); Masahiro Sunohara, Nagano (JP)

(73) Assignee: Shinko Electric Industries Co., Ltd., Nagano-shi (JP)

( * ) Notice: Subject to any disclaimer, the term of this patent is extended or adjusted under 35 U.S.C. 154(b) by 597 days.

(21) Appl. No.: 12/191,454

(22) Filed: Aug. 14, 2008

(65) Prior Publication Data

US 2009/0067116 A1 Mar. 12, 2009

(30) Foreign Application Priority Data

Sep. 12, 2007 (JP) .................................. 2007-236663

(51) Int. Cl.
*H01G 4/002* (2006.01)
*H01G 4/005* (2006.01)

(52) U.S. Cl. .................. 361/303; 361/301.1; 361/306.3; 361/313; 361/763

(58) Field of Classification Search .................. 361/303, 361/301.1, 306.3, 313, 763
See application file for complete search history.

(56) References Cited

U.S. PATENT DOCUMENTS

| | | | | |
|---|---|---|---|---|
| 7,054,141 B2* | 5/2006 | Sakaguchi et al. | ............ | 361/523 |
| 7,279,771 B2* | 10/2007 | Sunohara et al. | ............ | 257/516 |
| 7,420,128 B2* | 9/2008 | Sunohara et al. | ............ | 174/260 |
| 7,640,655 B2* | 1/2010 | Sunohara | ........................ | 29/832 |
| 2005/0108874 A1* | 5/2005 | Lee et al. | ........................ | 29/849 |
| 2005/0280978 A1* | 12/2005 | Sakaguchi et al. | ............ | 361/523 |
| 2006/0144617 A1 | 7/2006 | Kim et al. | ..................... | 174/250 |
| 2006/0196691 A1* | 9/2006 | Ahn et al. | ..................... | 174/256 |
| 2006/0207791 A1* | 9/2006 | Kim et al. | ..................... | 174/266 |
| 2007/0056766 A1* | 3/2007 | Sunohara | ..................... | 174/260 |
| 2007/0086145 A1* | 4/2007 | Kubota et al. | ................. | 361/311 |
| 2008/0110667 A1* | 5/2008 | Ahn et al. | ..................... | 174/257 |
| 2008/0158770 A1* | 7/2008 | Lee et al. | ................... | 361/301.1 |
| 2008/0314863 A1 | 12/2008 | Kim et al. | ......................... | 216/6 |
| 2009/0025195 A1* | 1/2009 | Kim et al. | .................... | 29/25.03 |

FOREIGN PATENT DOCUMENTS

JP 2006-190924 7/2006
JP 2007-150180 A1 6/2007

OTHER PUBLICATIONS

Japanese Office Action mailed Nov. 8, 2011 in counterpart application No. 2007-236663 with partial English translation (4 pages).

* cited by examiner

*Primary Examiner* — Anatoly Vortman
(74) *Attorney, Agent, or Firm* — Kratz, Quintos & Hanson, LLP (57) ABSTRACT

A capacitor-embedded substrate includes a base material having a desired thickness, and a pair of conductors (feedthrough electrodes) each formed in a desired pattern to penetrate through the base material in the thickness direction thereof, and oppositely disposed with an insulating layer interposed therebetween. The pair of electrodes are formed in comb-shaped patterns, and are oppositely disposed in such a manner that respective comb-tooth portions are meshed with each other.

1 Claim, 9 Drawing Sheets

FIG. 1A

FIG. 1B SECTIONAL VIEW ALONG A-A' LINE

FIG. 5A

FIG. 5B  ENLARGED PLAN VIEW AT "P" PORTION

FIG. 5C  SECTIONAL VIEW ALONG B-B' LINE

FIG. 6A

FIG. 6B  SECTIONAL VIEW ALONG C-C' LINE

CAPACITOR-EMBEDDED SUBSTRATE AND METHOD OF MANUFACTURING THE SAME

CROSS-REFERENCE TO RELATED APPLICATIONS

This application is based on and claims priority of Japanese Patent Application No. 2007-236663 filed on Sep. 12, 2007, the entire contents of which are incorporated herein by reference.

BACKGROUND OF THE INVENTION (a) Field of the Invention

The present invention relates to a substrate having a capacitor embedded therein and, more particularly, to a capacitor-embedded substrate to be used as a base material for a multilayer wiring board or a module, or as an interposer, in each of which a semiconductor device (or chip), an electronic component or the like requiring high speed switching operation is mounted, and a method of manufacturing the same.

As employed herein, the multilayer wiring board is also referred to as a "semiconductor package" for the sake of convenience in the description below, in consideration of the function as a package for mounting semiconductor devices (or chips) or the like.

(b) Description of the Related Art

Semiconductor packages or the like have been recently required to have finer and denser wiring, and thus have been provided with wiring patterns in close proximity to each other. Such wiring patterns, however, can possibly cause a problem such as occurrence of crosstalk noise between wirings or variations in the potential of a power supply line or the like. In particular, in a package for mounting a semiconductor chip, an electronic component or the like required to perform high speed switching operation, the crosstalk noise is easy to be generated due to the rise in frequency, and also, high speed on-off operation of a switching element produces switching noise, so that variations in the potential of the power supply line or the like are easy to increase. To cope with this, packages for mounting semiconductor chips or the like have hitherto been provided with a chip capacitor for "decoupling" power supply lines or the like for the purposes of stabilization of power supply voltage and reduction in switching noises or the like.

However, this situation can possibly lead to the design freedom of the wiring pattern being restricted in accordance with the provision of the chip capacitor, or may possibly increase the routing length of the wiring pattern that connects the chip capacitor to a power supply/ground terminal of the semiconductor chip or the like, resulting in an increase in inductance. The smallest possible inductance is desirable because large inductance degreases a decoupling effect.

Instead of providing a chip capacitor to a package, other possible means for coping with the above problem is to provide an equivalent capacitative device inside a package. Also, the technologies of embedding a capacitor function into a substrate for passive components have come into practical use, accompanied by recent miniaturization and slimming-down of electronic devices such as mobile devices or portable devices. One of the technologies is to form a buried electrode in an insulating layer of the substrate by using a high-permittivity insulating sheet. In a typical configuration example of this technology, a high-permittivity insulating resin sheet (e.g., resin sheet containing an inorganic filler for enhancement of permittivity) is disposed as a dielectric of the capacitor in an organic resin substrate, and conductor layers (i.e., wiring layers) that form a pair of electrodes of the capacitor are provided on the resin sheet with being interposed therebetween.

One example of a technology related to the above conventional technology is disclosed in Japanese unexamined Patent Publication (Kokai) 2007-150180. The technology disclosed in this publication involves: providing at least one surface of a base material having flexibility with a wiring pattern; forming a circuit component monolithically integrated with the base material by filling a predetermined material into a groove formed in the one surface with a predetermined depth and in a predetermined pattern shape; and providing a connection between the circuit component and the wiring pattern, thereby forming a flexible circuit board. This flexible circuit board includes as one circuit component a capacitor constituted by: a pair of comb-shaped electrodes formed by filling an electrode material into grooves that are formed into comb-shaped patterns facing each other; and a dielectric layer formed by base material between the pair of comb-shaped electrodes.

As mentioned above, the technology of embedding the capacitor function into the semiconductor package has been brought into practical use accompanied by the recent miniaturization or the like of the electronic device and for the purposes of effective functioning of the decoupling effect. In this case, it is desirable that the capacitor have the largest possible capacitance in order to optimize the function as a capacitor. However, an attempt to increase the capacitance of the capacitor involves various problems as given below.

Specifically, a high-permittivity insulating resin sheet (with a permittivity about 45) as mentioned above has a considerably low value of the permittivity, compared with a conventionally-used ceramic chip capacitor (with a permittivity of about 20000). Therefore, considering the formation of the capacitor having larger capacitance (around 100 nF), achievement for the desired capacitance requires: an increase in size of the facing area of the electrodes having the sheet sandwiched therebetween; a reduction in thickness of the sheet (i.e., the distance between the electrodes); or a further heightening of the permittivity. To heighten the permittivity requires an increase in a content rate of the inorganic filler in the high-permittivity insulating resin sheet; however, there are technological limitations under the present circumstances. Meanwhile, as for the approach of reducing the thickness of the high-permittivity insulating resin sheet, the technology itself has its limitations for forming a thin resin sheet. Even if the sheet is successfully thinly formed in a desired thickness, the thinly formed sheet is fully expected to become difficult to handle.

On the other hand, the increase in size of the facing area of the electrodes (i.e., a portion of the conductor layer) having the high-permittivity insulating resin sheet sandwiched therebetween requires allocation of almost all portions of the conductor layers solely to the electrodes, which in turn increases the area occupied by the electrodes in the conductor layers and thus accordingly impairs the degree of freedom of other wirings. Another approach for the increase in size of the facing area of the electrodes is to alternately stack on top of each other the insulating layers (i.e., resin layers) that form the dielectrics, and the conductor layers that form the electrodes; however, it is required that the layers be formed one by one, as in the case of build-up process, which in turn increases the process time and hence leads to a rise in cost. Additionally, still another possible approach for the increase in size of the facing area of the electrodes is to form a staggered arrangement of the dielectrics (i.e., the insulating layers) and the electrodes (i.e., the conductor layers) to form a comb-shaped structure (namely, a parallel capacitor); however, with this approach, it is difficult to form a multilayer structure.

SUMMARY OF THE INVENTION

An object of the present invention is to provide a capacitor-embedded substrate and a method of manufacturing the same, capable of facilitating implementation of a capacitor function adapted to larger capacitance.

Another object of the present invention is to provide a method of manufacturing a capacitor-embedded substrate, capable of contributing to a reduction in manufacturing cost and an improvement in the degree of wiring freedom.

According to one aspect of the present invention, there is provided a capacitor-embedded substrate including: a base material having a desired thickness; and a pair of conductors formed in respective desired patterns to penetrate through the base material in a thickness direction thereof, and oppositely disposed with an insulating layer interposed therebetween.

With the configuration of the capacitor-embedded substrate according to this aspect, a pair of the conductors formed penetrating through the base material having the desired thickness in the thickness direction thereof are utilized as feedthrough electrodes of the capacitor, and the insulating layer interposed between the conductors is utilized as a dielectric layer of the capacitor. In other words, the capacitor is formed in three dimension within the base material, so that the capacitor is adaptable to larger capacitance. For example, the pair of the conductors are formed in a shape of a comb-shaped pattern and are oppositely disposed in such a manner that respective comb-tooth portions are meshed with each other, thereby enabling an increase in the facing area between the electrodes and hence a contribution to achievement of larger capacitance, even if the capacitor is formed into a small area.

Also, according to another aspect of the present invention, there is provided a method of manufacturing a capacitor-embedded substrate, including: forming an opening in a desired pattern penetrating through a base material having a desired thickness in a thickness direction thereof; forming an insulating layer on an inner wall surface of the opening; filling a conductor into the opening coated with the insulating layer; removing a portion of the base material interposed between the insulating layers; and filling the removed portion with a conductor.

Detailed description is given with reference to embodiments of the present invention with regard to other structural features and advantages and the like based thereon, of the capacitor-embedded substrate and the method of manufacturing the same according to the present invention.

BRIEF DESCRIPTION OF THE DRAWINGS

FIGS. 1A and 1B are views showing the configuration of a capacitor-embedded substrate according to a first embodiment of the present invention.

FIGS. 5A, 5B and 5C are views showing the configuration of a capacitor-embedded substrate according to a second embodiment of the present invention.

FIGS. 6A and 6B are views showing the configuration of a capacitor-embedded substrate according to a third embodiment of the present invention.

DESCRIPTION OF THE PREFERRED EMBODIMENTS

Description is given below with regard to preferred embodiments of the present invention with reference to the accompanying drawings.

First Embodiment

See FIGS. 1A to 4D

Figure 1A:
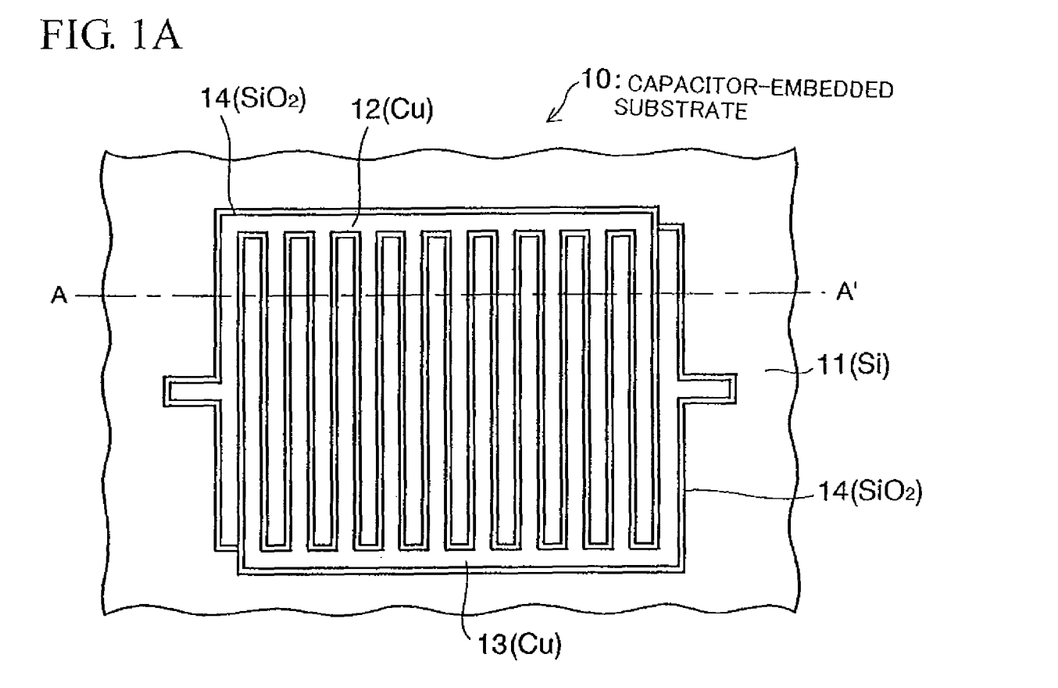
FIG. 1A is a plan view thereof and FIG. 1B is a sectional view taken along the line A-A' of FIG. 1A.
Figure 1B:
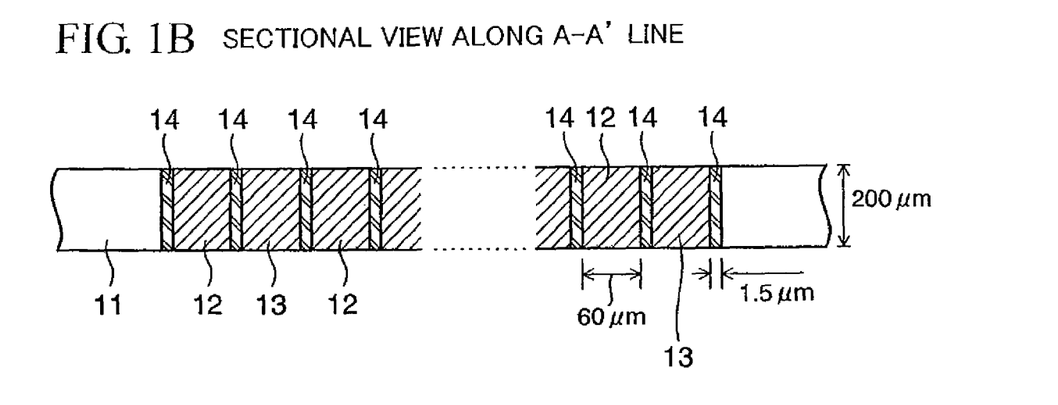

FIGS. 1A and 1B schematically show the configuration of a capacitor-embedded substrate according to the first embodiment of the present invention. FIG. 1A illustrates a plan configuration thereof and FIG. 1B illustrates a sectional configuration thereof when viewed along the line A-A' of FIG. 1A.

As shown in FIGS. 1A and 1B, a capacitor-embedded substrate 10 according to the first embodiment is basically constituted by: a silicon (Si) substrate 11 used as a base material; an insulating layer 14 made of silicon dioxide ($SiO_2$), and formed on the inner wall surfaces of two openings each formed in a comb-shaped pattern penetrating through the Si substrate 11 in the thickness direction thereof; and conductors 12 and 13 made of copper (Cu), filled into each opening coated with the insulating layer 14. The conductors 12 and 13 constitute electrodes of the capacitor, and the insulating layer 14 constitutes a dielectric layer of the capacitor. The electrodes 12 and 13 are oppositely disposed in such a manner that respective comb-tooth portions of the comb-shaped pattern are meshed with each other. Also, the insulating layer 14 is formed on the inner wall surfaces of the openings, while the insulating layer 14 is formed in such a manner as to be shared between the electrodes 12 and 13 in a location where the comb-tooth portions of the electrodes 12 and 13 are oppositely formed, as shown in FIGS. 1A and 1B.

The first embodiment is characterized in that the conductors 12 and 13 formed penetrating through the Si substrate 11 in the thickness direction thereof are configured as the electrodes (namely, feedthrough electrodes) of the capacitor and the insulating layer ($SiO_2$) 14 interposed between the electrodes 12 and 13 is configured as the dielectric layer of the capacitor, or equivalently, in that the capacitor is formed in three dimension within the Si substrate 11. In this instance, the insulating layer 14 that forms the dielectric layer of the capacitor is made of $SiO_2$ and thus has relatively low permittivity. Therefore, a "comb-shaped" electrode structure as shown in FIG. 1A is adopted in order to effectively increase the capacitance of the capacitor. Adoption of such an electrode structure enables increasing the facing area of the electrodes 12 and 13 and thus contributes to achievement of larger capacitance, even if the capacitor is formed into a small area. Incidentally, the thickness of the Si substrate 11 is set approximately equal to 200 μm; the thickness of each of the electrodes 12 and 13 is set approximately equal to 60 μm; and the thickness of the dielectric layer ($SiO_2$) 14 is set approximately equal to 1.5 μm.

Description is given below with regard to a method of manufacturing the capacitor-embedded substrate 10 according to the first embodiment with reference to FIGS. 2A to 4D showing an example of a manufacturing process thereof.

First, at the first step (see FIG. 2A), the silicon (Si) substrate 11 thinly formed in a predetermined thickness is prepared. For example, this involves preparing a Si wafer of 12 inches in size and of about 725 μm thick, and grinding one or both surfaces of the wafer by use of a grinding device, thereby thinning the wafer to a thickness of about 200 μm.

At the next step (see FIG. 2B), an opening OP1 is formed penetrating through the Si substrate 11 in a desired position in a desired pattern shape in the thickness direction of the Si substrate 11 by dry etching method such as reactive ion etching (RIE) or sputter etching. Although the openings OP1 seems as if separately formed dispersedly in ten places as shown in the example in FIG. 2B, one opening OP1 is actually formed. This opening OP1 is filled with the conductor that forms one of the electrodes of the capacitor, as is described later. In other words, the opening OP1 is formed in the "comb-shaped" pattern when viewed in plan (see FIG. 1A).

Figure 2A:
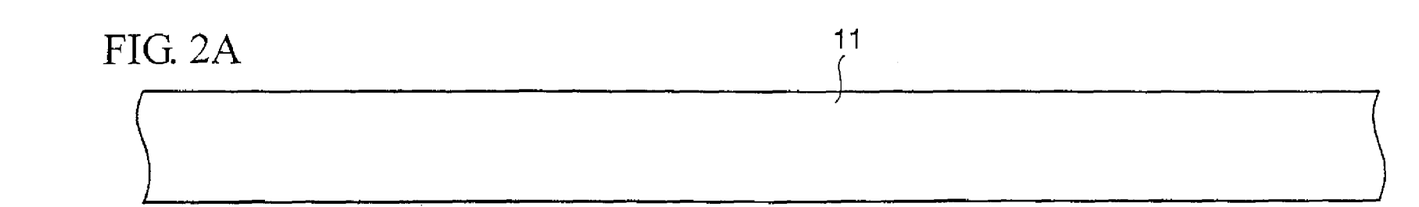
FIGS. 2A to 2D are sectional views showing manufacturing steps for the capacitor-embedded substrate shown in FIGS. 1A and 1B.

At the next step (see FIG. 2C), the insulating layer 14 is formed as the dielectric layer of the capacitor on the inner wall surface of the opening OP1. First, the insulating layer 14 made of silicon oxide ($SiO_2$) is formed throughout the entire surface of the Si substrate 11, including the inner wall of the opening OP1, by thermal oxidation method, CVD (chemical vapor deposition) method, vapor deposition, or the like. Then, the Si substrate 11 having the insulating layer 14 formed throughout the entire surface is polished at both surfaces by chemical polishing or chemical mechanical polishing (CMP), and continues being polished to become flattened, until the Si substrate 11 is exposed at both surfaces (namely, until reaching a level where the insulating layer 14 remains only on the inner wall surface of the opening OP1), as shown in FIG. 2C.

At the next step (see FIG. 2D), copper (Cu) foil 15 is applied to one surface (the bottom side in the example in FIG. 2D) of the Si substrate 11 having the insulating layer 14 formed on the inner wall surface of the opening OP1. The copper foil 15 functions as a seed layer (i.e., a power feed layer) for electroplating process to be performed later.

At the next step (see FIG. 3A), the Si substrate 11 having the seed layer (i.e., the copper foil 15) formed at one surface and the insulating layer 14 formed on the inner wall surface of the opening OP1 (see FIG. 2D) is electroplated with Cu with the seed layer 15 acting as the power feed layer, whereby the opening is filled with a conductor (Cu) 12a.

Figures 3A, 3B:
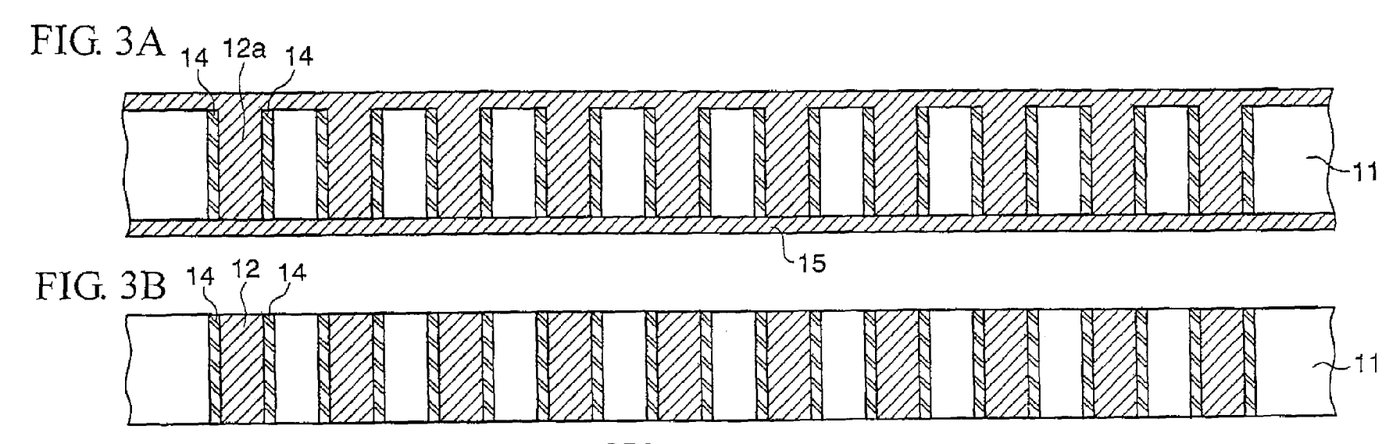
FIGS. 3A to 3D are sectional views showing manufacturing steps following the steps shown in FIGS. 2A to 2D.

At the next step (see FIG. 3B), the Si substrate 11 having the seed layer 15 formed at one surface and the conductor 12a formed at the other surface by being filled into the opening is polished at both surfaces by chemical polishing or CMP, and continues being polished to become flattened, until the Si substrate 11 is exposed at both surfaces as shown in FIG. 3B. Thereby, the formation of one of the electrodes of the capacitor, namely, the electrode 12 (see FIGS. 1A and 1B), is accomplished.

Figure 2B:
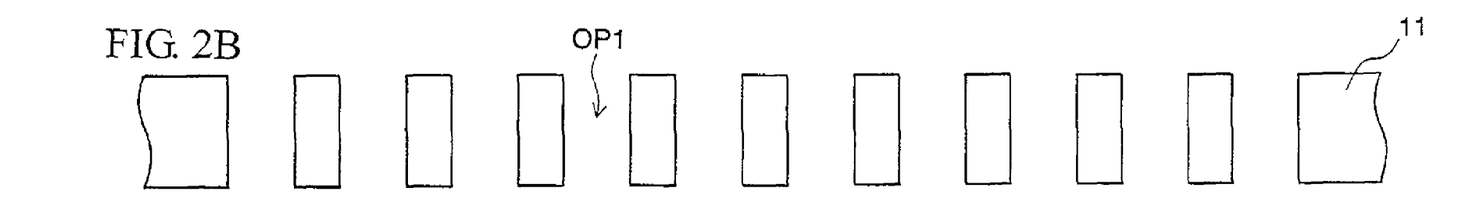
Figure 2C:
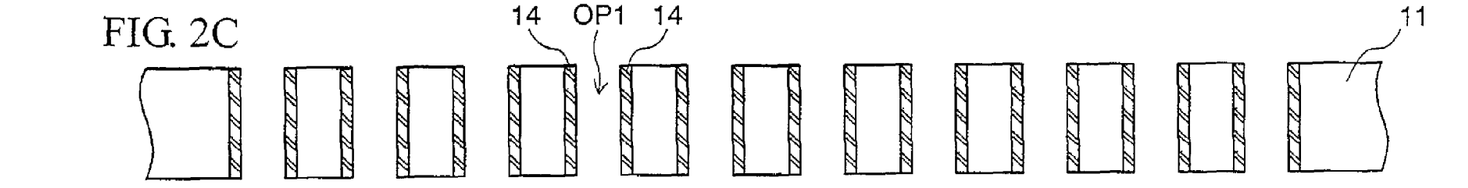
Figure 2D:
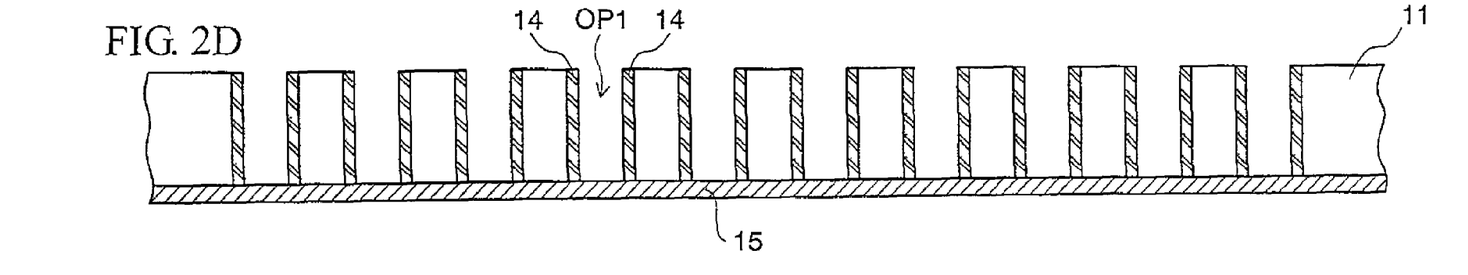

At the next step (see FIG. 3C), in the same manner as the processes performed at the steps of FIGS. 2B and 2D, an opening OP2 is formed by etching away "Si" in a portion of the Si substrate 11 interposed between the insulating layers 14 (namely, the portion facing the comb-tooth portion of the electrode 12 formed in the comb-shaped pattern shape) by means of dry etching method such as reactive ion etching (RIE) or sputter etching. Furthermore, copper (Cu) foil 16 is applied as a seed layer to one surface (the bottom side in the example in FIG. 3C) of the Si substrate 11. The opening OP2 thus formed is filled with the conductor that forms the other electrode of the capacitor, as is described later.

At the next step (see FIG. 3D), in the same manner as the process performed at the step of FIG. 3A, the Si substrate 11 having the seed layer (i.e., the copper foil 16) formed at one surface and the opening OP2 (see FIG. 3C) formed at the other surface is electroplated with Cu with the seed layer 16 acting as a power feed layer, whereby the opening is filled with a conductor (Cu) 13a.

Figures 3C, 3D:
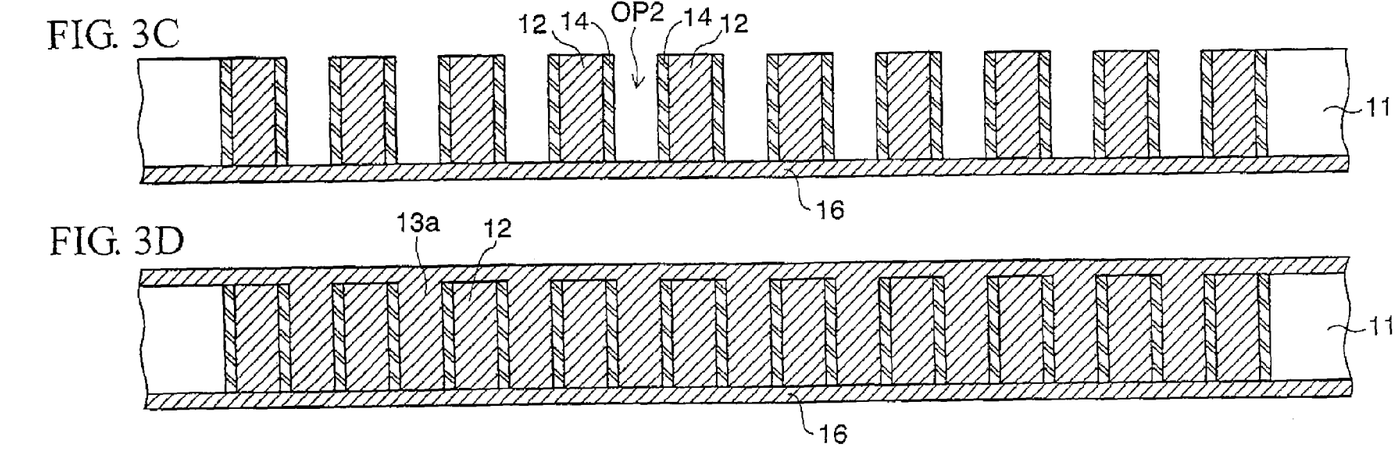
Figure 4A:
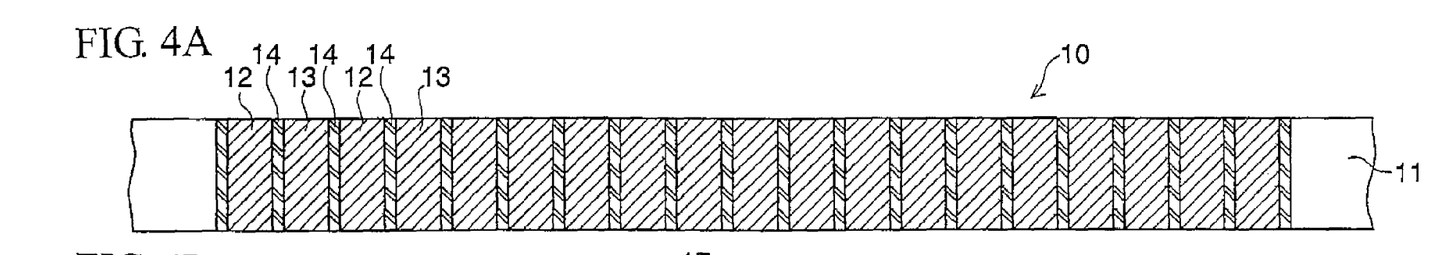
FIGS. 4A to 4D are sectional views showing manufacturing steps following the steps shown in FIGS. 3A to 3D.
Figure 4B:
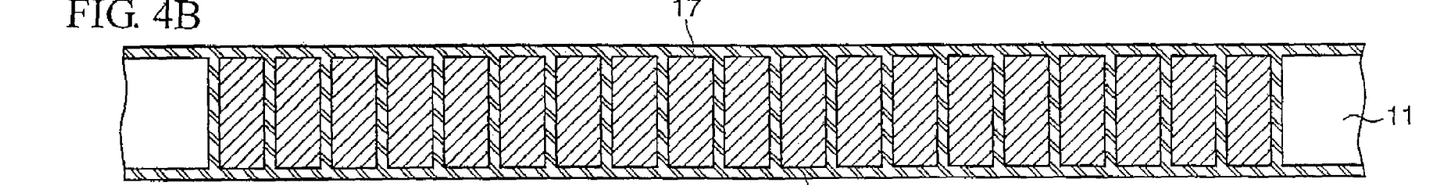
Figure 4C:
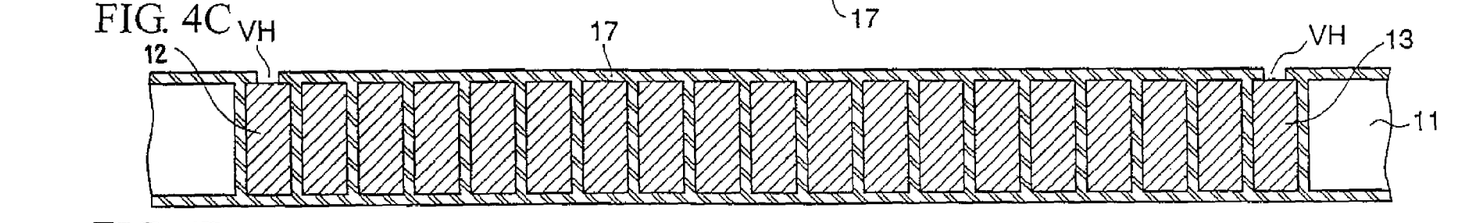
Figure 4D:
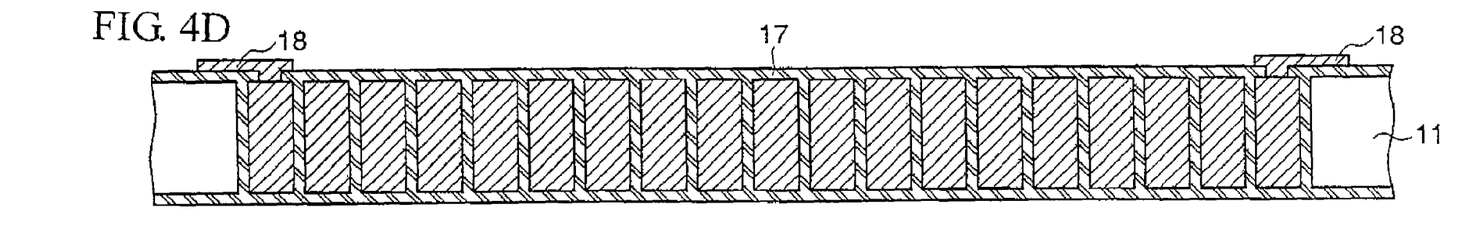

At the next step (see FIG. 4A), in the same manner as the process performed at the step of FIG. 3B, the Si substrate 11 having the seed layer 16 (see FIG. 3D) formed at one surface and the conductor 13a formed at the other surface by being filled into the opening is polished at both surfaces by chemical polishing or CMP, and continues being polished to become flattened, until the Si substrate 11 is exposed at both surfaces as shown in FIG. 4A. Thereby, the formation of the other electrode 13 of the capacitor is accomplished, so that the formation of the capacitor-embedded substrate 10 shown in FIGS. 1A and 1B is basically accomplished.

At the next step (see FIG. 4B), insulating layers 17 made of silicon oxide ($SiO_2$), which function as protection films for the capacitor, are formed on both surfaces of the silicon (Si) substrate 11 of the capacitor-embedded substrate 10 fabricated through the preceding steps, by thermal oxidation method, CVD method, vapor deposition, or the like.

At the next step (see FIG. 4C), via holes VH are formed in desired positions on one surface (the upper side in the example in FIG. 4C) in the insulating layer 17 thus formed of the Si substrate 11, by means of a $CO_2$ (carbon dioxide) laser, a YAG (yttrium aluminum garnet) laser, an excimer laser, or the like. The positions where the via holes VH are formed are selected at least two positions in the insulating layer region, corresponding respectively to the portions where the electrodes 12 and 13 of the capacitor are formed.

At the final step (see FIG. 4D), wiring patterns 18 are formed in a desired shape by filling in each of the via holes VH. For example, this involves forming a seed layer on the insulating layer 17 including the inside of the via hole VH by means of electroless copper (Cu) plating or the like; either filling the via hole VH with Cu by means of Cu electroplating with the seed layer acting as a power feed layer, or filling conductive paste containing metal such as Cu into the via hole VH by means of screen printing method or the like; and then forming the wiring patterns 18 made of Cu in the desired shape by means of subtractive process, semi-additive process, ink-jet process, or the like. The formed wiring patterns 18 can be utilized as electrode terminals of the capacitor.

As described above, according to the capacitor-embedded substrate 10 according to the first embodiment (see FIGS. 1A and 1B) and the method of manufacturing the same (see FIGS. 2A to 4D), a pair of the conductors 12 and 13 formed penetrating through the Si substrate 11 having a desired thickness in the thickness direction thereof are utilized as the feedthrough electrodes of the capacitor, and the insulating layer ($SiO_2$) 14 interposed between the electrodes 12 and 13 is utilized as the dielectric layer of the capacitor. In other words, the capacitor is formed in three dimension within the Si substrate 11, and further, the electrodes 12 and 13 each have the "comb-shaped" electrode structure, thus enabling an effective increase in the facing area between the electrodes 12 and 13 even if the capacitor is formed into a small area (or occupied area). This greatly contributes to achievement of larger capacitance of the capacitor.

Also, the formation of the dielectric layer ($SiO_2$) 14 of the capacitor can be accomplished merely by thermally oxidizing or otherwise processing the inner wall surface of the opening formed in the Si substrate 11 in the desired position, using the Si substrate 11 as the base material. In other words, the formation of the dielectric layer 14 of multilayer structure can be accomplished in a single step (see FIG. 2C), thus enabling a simplification of process and hence a contribution to a reduction in manufacturing cost, as compared with the conventional approach of alternately stacking on top of each other the insulating layers (i.e., the dielectric layers) and the conductor layers (i.e., the electrodes).

Also, where the capacitor-embedded substrate 10 is utilized as an interposer, the same material, namely "Si," as a constituent material for a semiconductor chip (typically, a silicon (Si) chip) mounted on the interposer is used for the base material 11, so that the coefficient of thermal expansion of the mounted chip can be substantially equal to that of the base material 11. This enables elimination of a disadvantage such as warpage or torsion resulting from a difference in heat shrinkage between the chip and the base material.

Second Embodiment

Figure 5A:
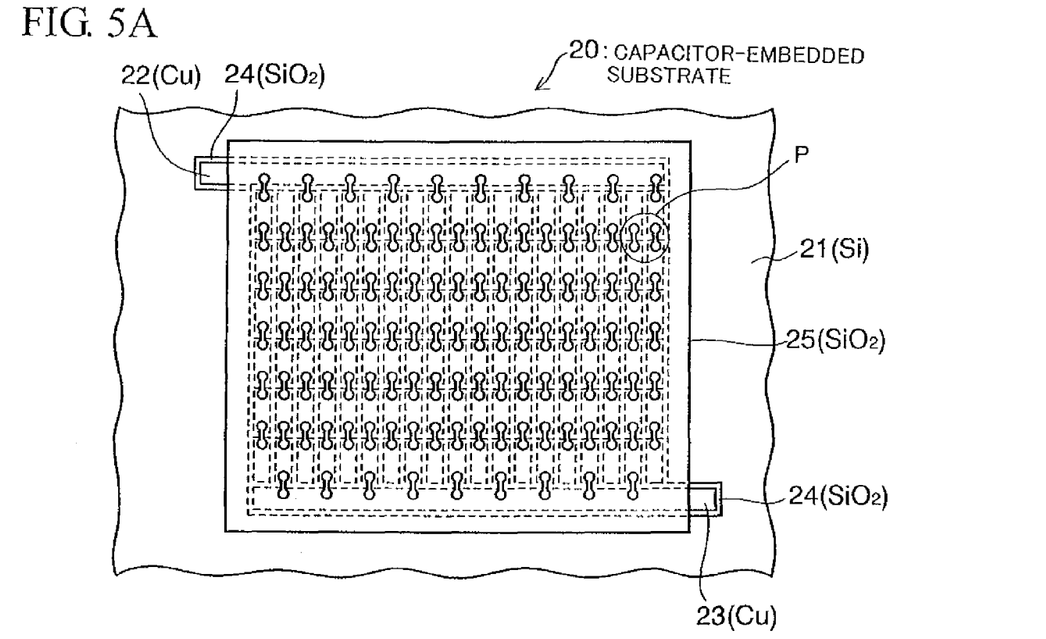
FIG. 5A is a plan view thereof.
Figure 5B:
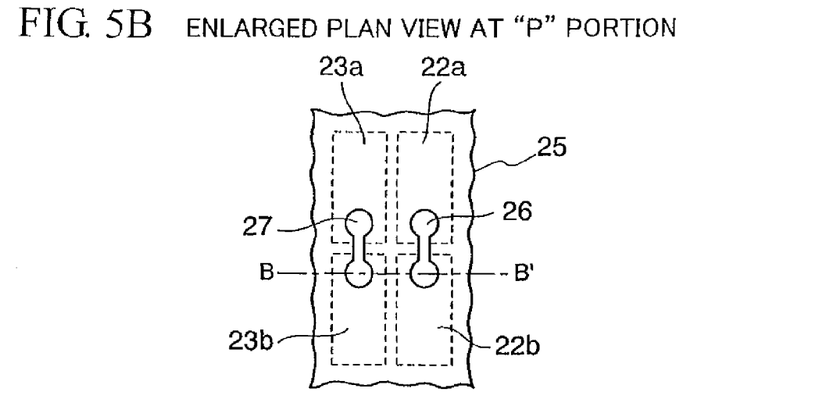
FIG. 5B is an enlarged plan view at "P" portion shown in FIG. 5A.
Figure 5C:
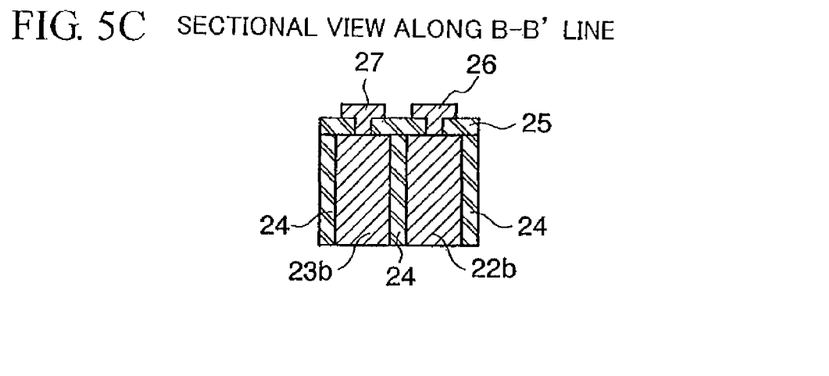
FIG. 5C is a sectional view taken along the line B-B' of FIG. 5B.

See FIGS. 5A to 5C

FIGS. 5A, 5B and 5C schematically show the configuration of a capacitor-embedded substrate according to the second embodiment of the present invention. FIG. 5A illustrates a plan configuration thereof, FIG. 5B shows a plan configuration thereof when viewed in enlarged view at "P" portion shown in FIG. 5A, and FIG. 5C shows a sectional configuration thereof when viewed along the line B-B' of FIG. 5B, respectively.

A capacitor-embedded substrate 20 according to the second embodiment is basically constituted, as in the case of the capacitor-embedded substrate 10 according to the first embodiment (see FIGS. 1A and 1B), by: a Si substrate 21 used as a base material; an insulating layer (i.e., a dielectric layer) 24 made of $SiO_2$, formed on the inner wall surfaces of two openings formed in a shape of a comb-shaped pattern penetrating through the Si substrate 21 in the thickness direction thereof; and conductors (i.e., electrodes) 22 and 23 made of Cu, filled into the openings coated with the insulating layer 24. The dispositions of the electrodes 22 and 23 and the insulating layer 24 are the same as described above for the first embodiment.

The second embodiment is further characterized in that the feedthrough electrodes 22 and 23 to be formed within the Si substrate 21 are dividedly formed into a predetermined number of portions (namely, divided electrodes into 22a and 22b and divided electrodes into 23a and 23b, respectively); an insulating layer 25 made of $SiO_2$ is vapor deposited or otherwise formed on one surface (the upper side in the example in FIGS. 5A to 5C) of the Si substrate 21; then, via holes are formed in the insulating layer 25 in desired locations; and wiring patterns (i.e., Cu conductors) 26 and 27 are formed on the insulating layer 25 including the via holes, whereby the wiring patterns 26 and 27 provide a connection between the two adjacent divided electrodes 22a and 22b and a connection between the two adjacent divided electrodes 23a and 23b, respectively. In other words, the capacitor to be essentially formed between the electrodes 22 and 23 has a structure having a parallel connection of multiple small-capacitance capacitors formed between the plural divided electrodes 22a (22b) and 23a (23b). Such a structure achieves a reduction in the inductance of the capacitor embedded in the Si substrate 21.

According to the second embodiment, further advantages can be obtained as given below, in addition to the above-mentioned advantageous effects obtained by the first embodiment. Specifically, it is generally known that the capacitor can lower its inductance when having its electrodes divided, compared with one when having its electrodes undivided. In the second embodiment, the feedthrough electrodes 22 and 23 to be formed within the Si substrate 21 are dividedly formed into plural portions as shown in FIGS. 5A to 5C, so that the inductance (namely, ESL (equivalent series inductance)) of the capacitor can be reduced without substantially reducing the capacitative value of the overall capacitor formed between the electrodes 22 and 23.

In addition, the inductance reduction enables boosting a resonance frequency and thus achieving the capacitor excellent in high-frequency characteristics. In other words, this enables the more effective functioning of the decoupling effect of the capacitor and thus a contribution to stable operation in the high-frequency region (i.e., the GHz band) for use in mobile devices, portable devices, or the like.

Third Embodiment

See FIGS. 6A to 8B

Figure 6A:
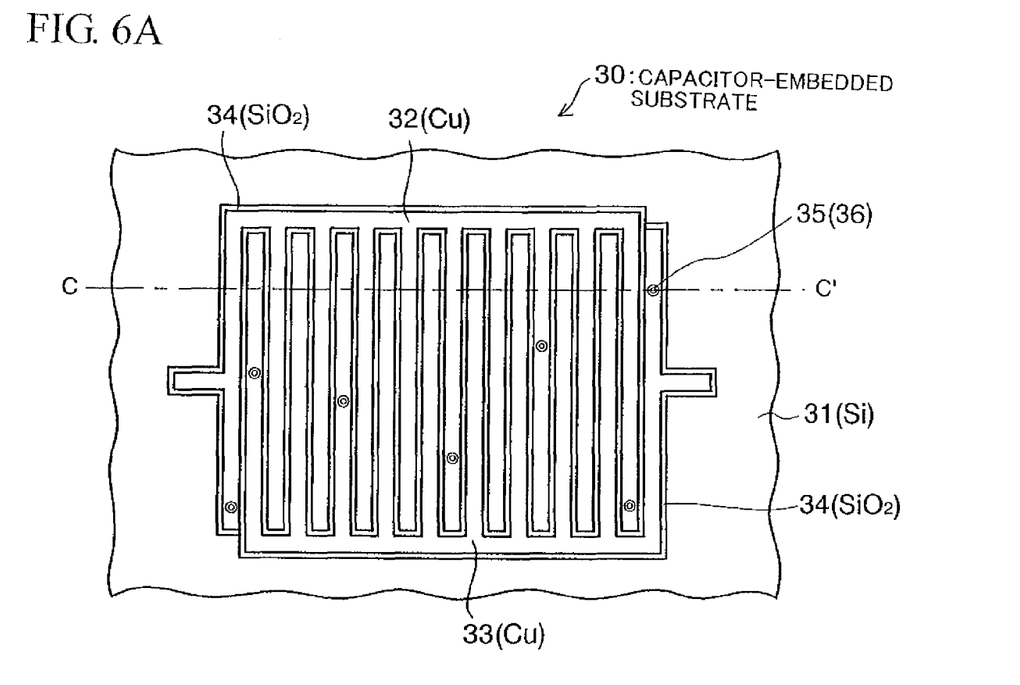
FIG. 6A is a plan view thereof and FIG. 6B is a sectional view taken along the line C-C' of FIG. 6A.
Figure 6B:
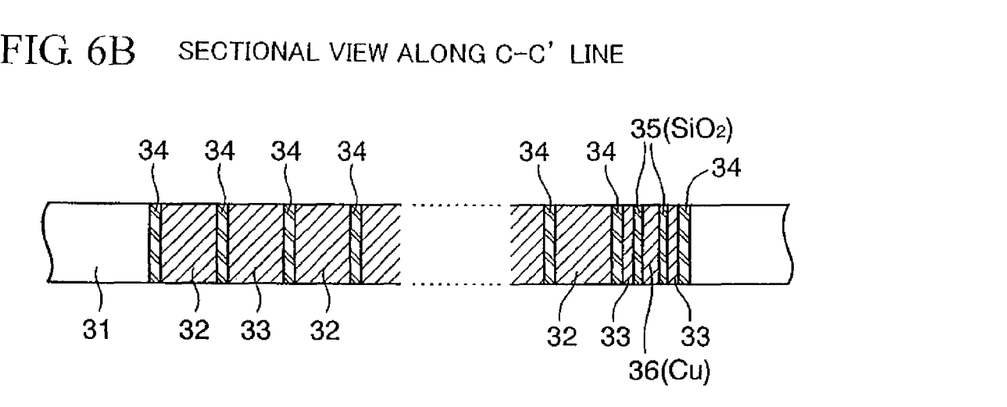

FIGS. 6A and 6B schematically show the configuration of a capacitor-embedded substrate according to the third embodiment of the present invention. FIG. 6A illustrates a plan configuration thereof and FIG. 6B illustrates a sectional configuration thereof when viewed along the line C-C' of FIG. 6A.

A capacitor-embedded substrate 30 according to the third embodiment is basically constituted, as in the case of the capacitor-embedded substrate 10 according to the first embodiment (see FIGS. 1A and 1B), by: a Si substrate 31 used acts as a base material; an insulating layer (i.e., a dielectric layer) 34 made of $SiO_2$, formed on the inner wall surfaces of two openings formed in a shape of a comb-shaped pattern penetrating through the Si substrate 31 in the thickness direction thereof; and conductors (i.e., electrodes) 32 and 33 made of Cu, filled into the openings coated with the insulating layer 34. The dispositions of the electrodes 32 and 33 and the insulating layer 34 are the same as described above for the first embodiment.

The third embodiment is further characterized in that a conductor (i.e., a second feedthrough electrode) 36 made of Cu is formed within the electrodes (i.e., first feedthrough electrodes) 32 and 33 of the capacitor in such a relationship that the electrode 36 is insulated from the electrodes 32 and 33 (by an insulating layer 35 made of $SiO_2$). In other words, a double-feedthrough-electrode construction is adopted in which another feedthrough electrode is formed within the feedthrough electrodes of the capacitor. Such a construction achieves an improvement in the degree of wiring freedom of the substrate.

The capacitor-embedded substrate 30 according to the third embodiment can be manufactured basically in the same manner as the method of manufacturing the capacitor-embedded substrate 10 according to the first embodiment (see FIGS.

2A to 4D). FIGS. 7A to 7C and FIGS. 8A and 8B schematically show a manufacturing process for the capacitor-embedded substrate 30.

Figure 7A:
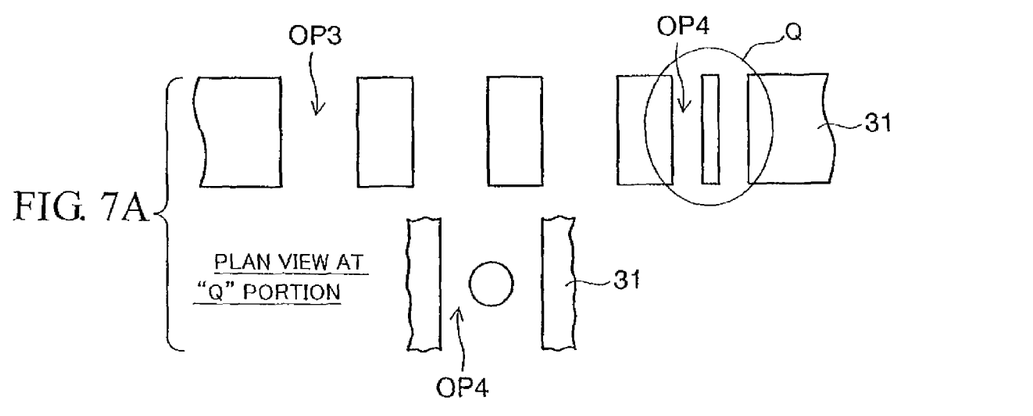
FIGS. 7A to 7C are sectional views showing manufacturing steps for the capacitor-embedded substrate shown in FIGS. 6A and 6B.
Figure 7B:
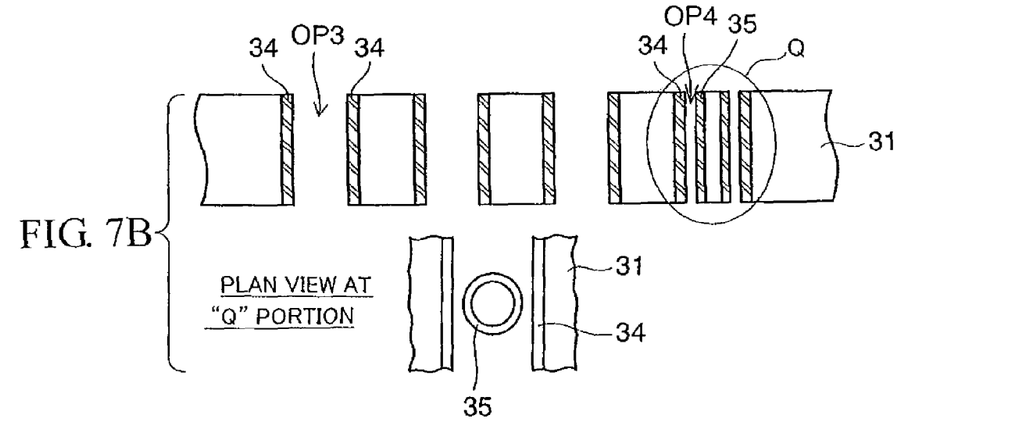
Figure 7C:
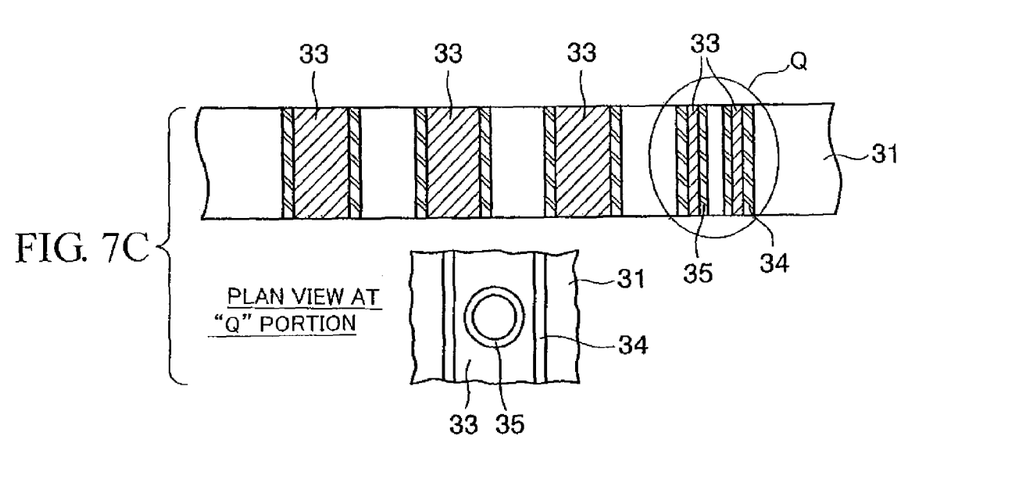
Figure 8A:
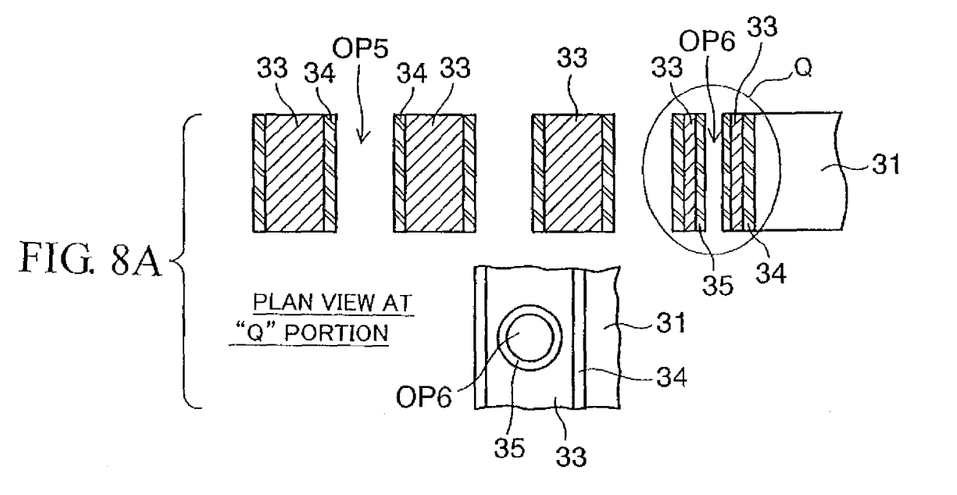
FIGS. 8A and 8B are sectional views showing manufacturing steps following the steps shown in FIGS. 7A to 7C.
Figure 8B:
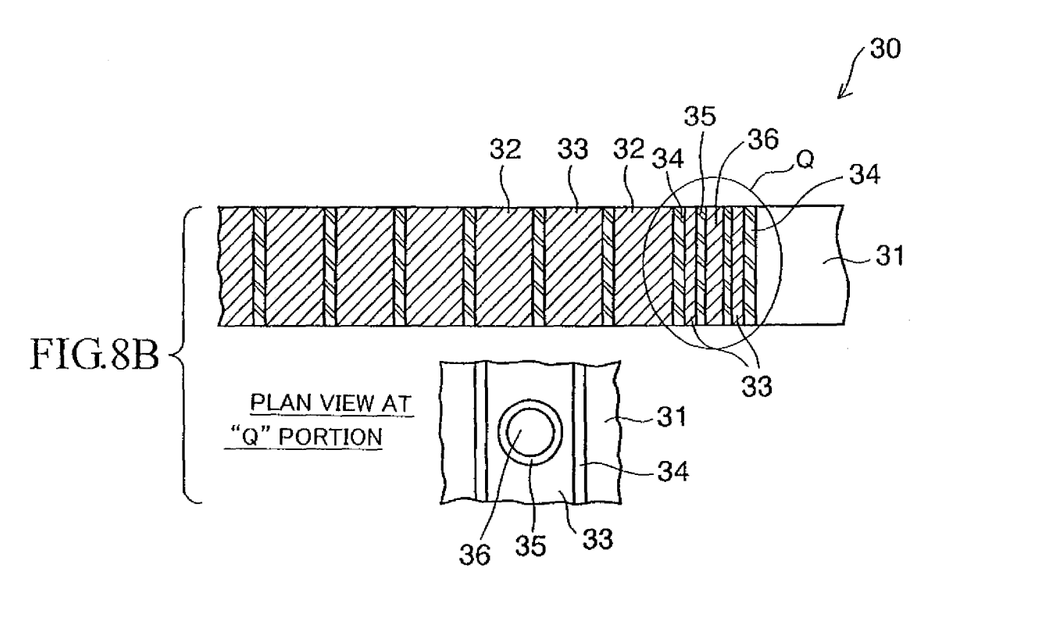

Specifically, the manufacture of the capacitor-embedded substrate 30 according to the third embodiment is accomplished by: going through the same process as that performed at the step of FIG. 2A; thereafter performing "silicon (Si) etching" in the same manner as the processing performed at the step of FIG. 2B (see FIG. 7A); then performing "the formation of the insulating layers 34 and 35 by means of thermal oxidation or the like, and the polishing of both surfaces of the Si substrate 31" in the same manner as the process performed at the step of FIG. 2C (see FIG. 7B); then performing "the application of a seed layer, the filling of conductors into openings OP3 and OP4 by means of copper (Cu) electroplating, and the polishing of both surfaces of the Si substrate 31" in the same manner as the processes performed at the steps of FIGS. 2D to 3B (see FIG. 7C); then performing "Si etching" in the same manner as the process performed at the step of FIG. 3C (see FIG. 8A); and then performing "the application of a seed layer, the filling of conductors into openings OP5 and OP6 by means of copper (Cu) electroplating, and the polishing of both surfaces of the Si substrate 31" in the same manner as the processes performed at the steps of FIGS. 3D to 4A (see FIG. 8B).

Note, the step of FIG. 7A includes concurrently the formation of the opening OP4 such that a portion of the Si substrate 31 corresponding to the shape of the second feedthrough electrode 36 remains, as well as the formation of the opening OP3 defining the shape of one of the electrodes of the capacitor, namely, the electrode 33. Also, the step of FIG. 7B includes concurrently the formation of the insulating layer 35 for insulating the second feedthrough electrode 36 from the first feedthrough electrode 33, as well as the formation of the insulating layer 34 as the dielectric layer of the capacitor. Also, the step of FIG. 7C includes concurrently the formation of the first feedthrough electrode 33 to finally contain the second feedthrough electrode 36, as well as the formation of the one electrode 33 of the capacitor.

Also, the step of FIG. 8A includes concurrently the formation of the opening OP6 in the portion of the Si substrate 31 corresponding to the shape of the second feedthrough electrode 36, as well as the formation of the opening OP5 defining the shape of the other electrode 32 of the capacitor. Also, the step of FIG. 8B includes concurrently the formation of the second feedthrough electrode 36, as well as the formation of the other electrode 32 of the capacitor.

According to the third embodiment, further advantages can be obtained as given below, in addition to the above-mentioned advantageous effects achieved by the first embodiment. Specifically, there is provided another feedthrough electrode (i.e., the second feedthrough electrode) 36 within the electrodes (i.e., the first feedthrough electrodes) 32 and 33 of the capacitor in such a relationship that the electrode 36 is insulated from the electrodes 32 and 33, so that other signal lines having no relation with the capacitor (e.g., a signal line linked to an external connection terminal) can be connected to the second feedthrough electrode 36 as needed, thus enabling enhancement of the degree of freedom of the wirings of the substrate 30.

Figure 9:
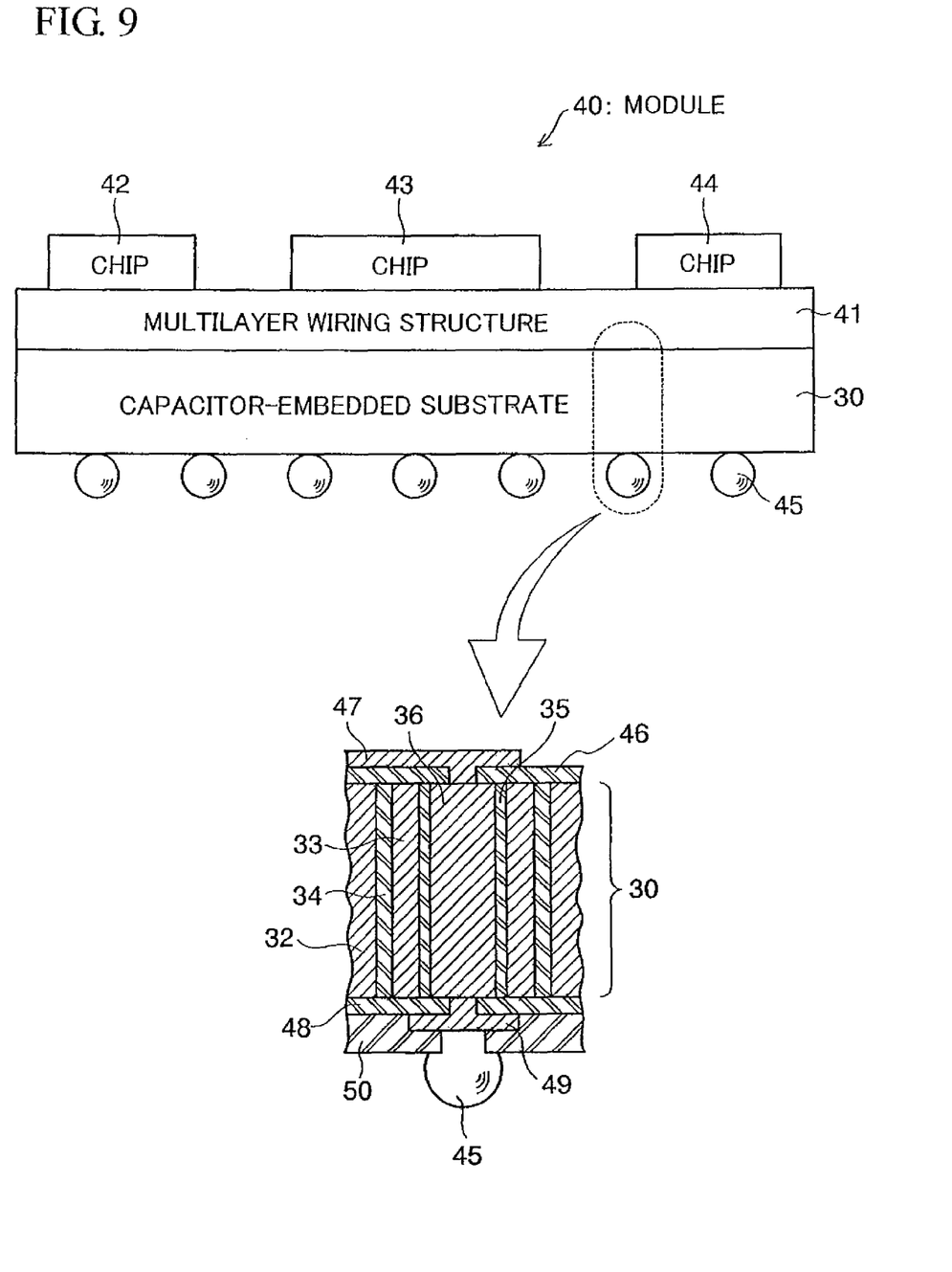
FIG. 9 is a sectional view schematically showing an example of the configuration of a module using any one of the capacitor-embedded substrates according to the embodiments of the present invention.

Preferably, the capacitor-embedded substrates 10, 20 and 30 according to the above-mentioned embodiments can be utilized as a base material or an interposer for a multilayer wiring board or a module both mounting a semiconductor device (or chip), an electronic component or the like therein requiring high speed operation. In that case, the capacitor-embedded substrates 10, 20 and 30 may be utilized separately, or two or more types of substrates may be utilized in combination as appropriate. FIG. 9 shows an example of application of the capacitor-embedded substrate, schematically illustrating an example of the configuration of a module using the capacitor-embedded substrate.

The exemplary configuration of a module 40 shown as an example in FIG. 9 uses the capacitor-embedded substrate 30 according to the third embodiment, and there are provided: a multilayer wiring structure 41 formed on one surface of the substrate 30 by use of build-up process or the like; further, plural chips 42, 43 and 44 (e.g., semiconductor chips such as a CPU (central processing unit) or an oscillator for an RF (radio-frequency) module) mounted on the multilayer wiring structure 41; and also, solder bumps 45 as external connection terminals on the other surface of the substrate 30. Such a module 40 is mounted on a mount board (not shown) such as a motherboard.

As for connections between the capacitor-embedded substrate 30 and the multilayer wiring structure 41 and between the capacitor-embedded substrate 30 and external connection terminal 45, a detailed sectional view thereof is shown in the lower part of FIG. 9. Specifically, an insulating layer 46 having a via hole in a desired position on the electrode 36 is formed on one surface of the second feedthrough electrode 36 formed within the electrode (i.e., the first feedthrough electrode) 33 of the capacitor in such a relationship that the electrode 36 is insulated from the electrode 33 (by the insulating layer 35), and further, a wiring pattern (i.e., a Cu conductor) 47 of a desired shape is formed on the insulating layer 46 including the via hole. The wiring pattern 47 is contained in the lowermost wiring layer of the multilayer wiring structure 41. Also, an insulating layer 48 having a via hole in a desired position on the second feedthrough electrode 36 is formed on the other surface of the electrode 36, and further, a wiring pattern (i.e., a Cu pad portion) 49 in a desired shape is formed on the insulating layer 48 including the via hole, and a solder resist layer 50 is formed as an protective film with the pad portion 49 exposed. Further, the external connection terminal (i.e., the solder bump 45) is connected to the pad portion 49 exposed from the solder resist layer 50. Incidentally, for bonding of the external connection terminal, it is desirable that the pad portion 49 be plated with nickel (Ni) and gold (Au) in advance. This plating is for the purpose of improving adhesion to the pad portion for solder bonding and also improving electrical conductivity to the external connection terminal.

In the above-mentioned embodiments, description has been given taking the case where a capacitor function alone is embedded in the silicon (Si) substrate; however, it is to be, of course, understood that a passive device embedded in the Si substrate is not limited to the capacitor alone, taking into account the role of the capacitor-embedded substrate (namely, the fact that the capacitor-embedded substrate is utilized as a base material or an interposer for a package or a module mounting a semiconductor chip or the like thereon). For example, an inductor function may be embedded in the Si substrate.

Such an inductor function, although not specifically shown, can be formed in the same manner as the method shown in FIGS. 2A to 4D. For example, the formation of the inductor can be accomplished by forming an opening in a "spiral" pattern penetrating through the silicon (Si) substrate in the thickness direction thereof, and then filling a conductor such as copper (Cu) into the opening. In other words, the inductor function, in conjunction with any one of the capacitors of the above-mentioned embodiments, may be collectively embedded in the same Si substrate. This contributes to a reduction in cost.

Also, the use of $SiO_2$ as an insulating layer on the Si substrate having the capacitor and inductor functions embedded therein enables the formation of finer multilayer wiring, thus enabling the utilization of the substrate as a compact and slim, high-density module wiring board.

Also, in the above-mentioned embodiments, description has been given taking the case where the insulating layers 14, 24 and 34 made of $SiO_2$, obtained by thermally oxidizing or otherwise processing the surfaces of the silicon (Si) substrates 11, 21 and 31, respectively, are utilized as the dielectric layers of the capacitors; however, it is to be, of course, understood that a constituent material for the dielectric layer is not limited to this. It is essential only that the material be of the highest possible permittivity, and for example, metal oxide such as BST ($BaSrTiO_3$: barium strontium titanate), BTO ($BaTiO_3$: barium titanate), STO ($SrTiO_3$: strontium titanate) or $TiO_x$ (titanium oxide), resin containing a filler of any one of these metal oxides, or the like may be used. MOCVD (metal organic chemical vapor deposition) method, sputtering, or the like can be used for deposition of these materials on the base material.

Also, in the above-mentioned embodiments, description has been given taking the case where the silicon (Si) substrate is used as the base material in which the passive device such as the capacitor is embedded; however, it is to be, of course, understood that an available base material is not limited to the Si substrate, as is apparent from the gist of the present invention (namely, a pair of conductors formed in a desired pattern shape penetrating through the base material in the thickness direction thereof are used as the electrodes of the capacitor, and the insulating layer interposed between the pair of electrodes is used as the dielectric layer of the capacitor, or equivalently, that the capacitor is formed in three dimension within the base material). For example, a resin substrate generally used for a build-up wiring board, a ceramic substrate or the like, may be used.

What is claimed is:

1. A capacitor-embedded substrate comprising:
a base material of silicon having a desired thickness;
a pair of conductors formed in respective desired patterns to penetrate completely through the base material in a thickness direction thereof, and oppositely disposed with an insulating layer of silicon dioxide interposed therebetween, wherein
the pair of conductors is formed in respective comb-shaped patterns, and is oppositely disposed in such a manner that respective comb-tooth portions are meshed with each other, and
the pair of conductors is divided into a plurality of divided portions electrically insulated from each other, such that a plurality of capacitor portions are arranged;
an upper insulating layer formed on the plurality of capacitor portions;
via holes reaching the pair of conductors in the plurality of capacitor portions, respectively; and
a wiring pattern formed on the upper insulating layer, and connecting the conductors of the plurality of capacitor portions through the via holes.

\* \* \* \* \*